July 24, 1962  R. F. DURHAM ET AL  3,045,442
ICE MAKING

Filed July 5, 1960  4 Sheets-Sheet 1

INVENTORS
RAYMOND F. DURHAM
JOHN M. KOEPCKE
BY
Herman Seid
ATTORNEY.

July 24, 1962  R. F. DURHAM ET AL  3,045,442
ICE MAKING
Filed July 5, 1960  4 Sheets-Sheet 2

INVENTORS
RAYMOND F. DURHAM
JOHN M. KOEPCKE
BY
Herman Seid
ATTORNEY.

July 24, 1962 R. F. DURHAM ET AL 3,045,442
ICE MAKING
Filed July 5, 1960 4 Sheets-Sheet 3
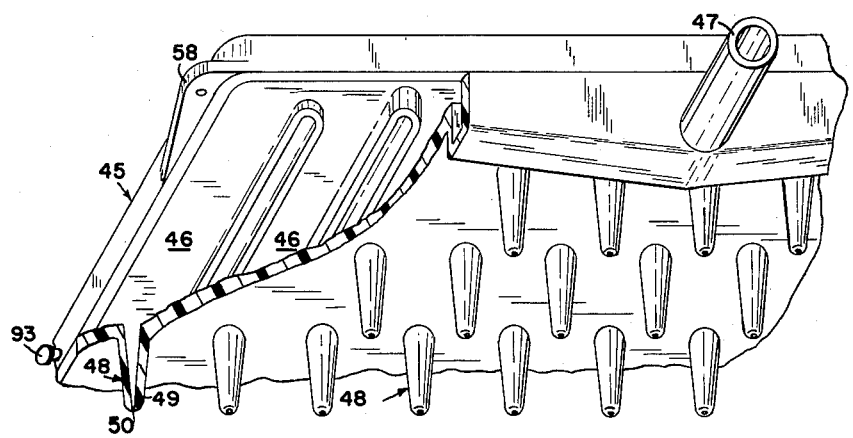
FIG. 4
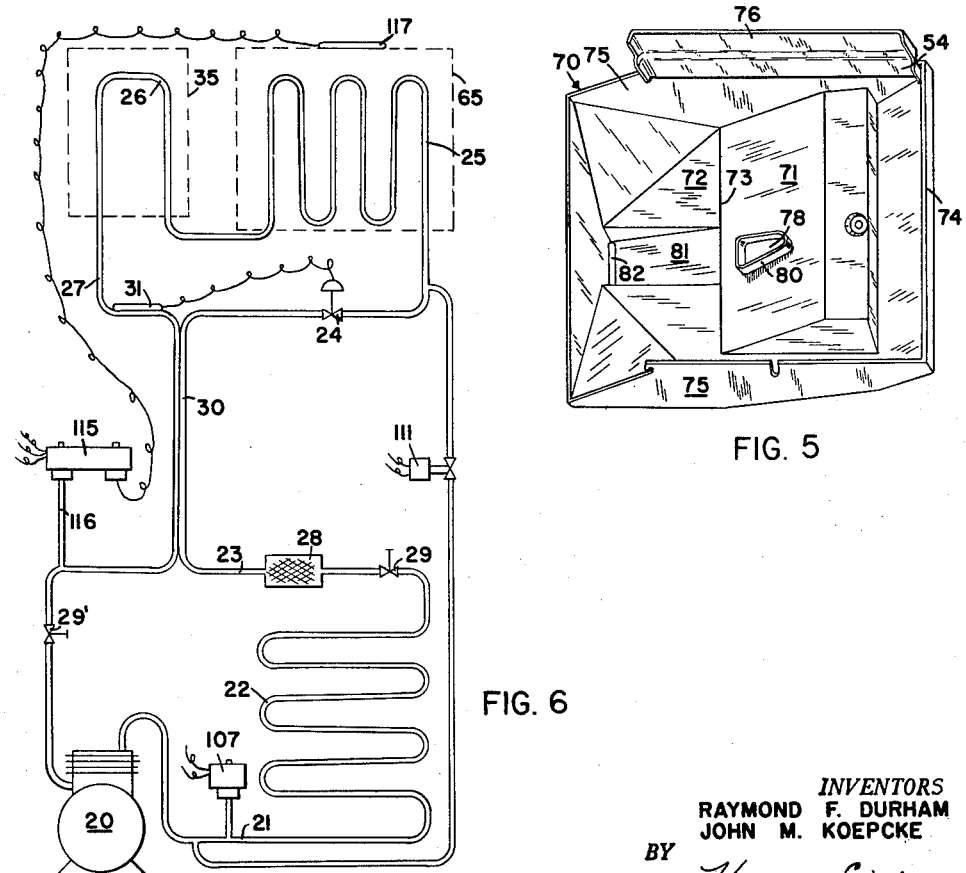
FIG. 5
FIG. 6
INVENTORS
RAYMOND F. DURHAM
JOHN M. KOEPCKE
BY
Herman Seid
ATTORNEY.

July 24, 1962  R. F. DURHAM ET AL  3,045,442
ICE MAKING

Filed July 5, 1960  4 Sheets—Sheet 4

INVENTORS
RAYMOND F. DURHAM
JOHN M. KOEPCKE
BY
Herman Seid
ATTORNEY.

United States Patent Office 3,045,442
Patented July 24, 1962

3,045,442
ICE MAKING
Raymond F. Durham, Liverpool, and John M. Koepcke, North Syracuse, N.Y., assignors to Carrier Corporation, Syracuse, N.Y., a corporation of Delaware
Filed July 5, 1960, Ser. No. 40,619
7 Claims. (Cl. 62—71)

This invention relates to ice forming, more particularly to novel apparatus, and methods implementing the refrigeration of water in the grid of an ice forming machine so as to uniformly and effectively cool the water in the cells of the grid whereby regularly shaped clear pieces of ice will be produced.

A variety of situations exist, in which it is desired to have available a relatively constant supply of ice. Thus in various commercial food establishments where iced comestibles or potables are dispensed, it is necessary to provide a relatively large supply of ice for chilling of food. In most such establishments whether restaurants, bars, or the like the ice supply should be continuous and any ice served with food should generally be of a shape to facilitate handling and provide a desired aesthetic effect, as well as providing the primary cooling function resulting from the use of ice. To this end various shapes of ice bodies have been utilized, such as flake ice, ice cubes, ice chips, ice balls, or the like. Of these various shapes, however, the so-called ice cube is found most preferable. The cube-shaped ice bodies should be of a uniform and regular shape.

In conventionally forming the desired ice cubes, a grid containing a plurality of cube-shaped cells is generally employed. Water is fed to the cells of the grid, and the water is frozen in the cells, after which the frozen water is released from the cells to provide the desired ice cubes. The broad general principle of freezing water in a cube-shaped cell is old in the art. However, a number of problems arise in connection with existing apparatus and procedures.

Thus it is found that a number of difficulties arise in attaining ice cubes of uniform quality and size. This is due to the difficulties involved in providing a uniform cooling gradient across the grid which results in ice of different density being formed in the cells of the grid so that spalling and other ice deformities arise. The problems inherent in effecting heat transfer from the cells of the grid to the refrigerant of a refrigeration system arise due to the complexity of the grid structure.

It is with these problems and desiderata in mind, that the present means have been evolved, means including both apparatus and method providing for the formation of a plurality of uniformly shaped clear ice pieces by the use of a grid containing cells of desired shape. The novel means serve to retain liquid to be frozen in the cells of the grid and simultaneously permits uniform refrigeration of the liquid in each cell.

It is accordingly a primary object of this invention to provide novel ice forming means including both apparatus and method.

Another object of the invention is to provide novel means for the refrigeration of a water-containing cell in a grid to insure a desired cooling gradient across all cells in the grid.

A further object of the invention is to provide a simple refrigerant evaporator adapted for use in forming ice in the cells of a grid.

An additional object of the invention is to provide improved means for retaining liquid to be frozen in the cells of an ice forming grid.

Another object of the invention is to provide improved means for directing harvested ice from an ice forming grid to a collection point.

It is also an object of the invention to provide a simple effective means for positioning a refrigerant evaporator in heat exchange relationship with the cells of an ice forming grid.

These, and other objects of the invention which will become hereafter apparent, are attained by providing an ice forming apparatus having a grid containing a plurality of cells confining a volume having a configuration like that of the ice to be formed. A compression refrigeration system is employed to refrigerate the cells of said grid and this is effected by arranging at least a portion of the evaporator of said compression refrigeration system within a movable platen arranged in heat exchange relationship with the cells of said grid. This movable platen serves the threefold function of closing off the cells of the grid to retain water therein, directing refrigerant into heat exchange relationship with the water retained in said cells, and deflecting the formed ice after harvesting to a collection and storage point in a bunker beneath the grid. A water supply system is provided directing water to the cells of the grid for freezing into the requisite ice bodies.

An important feature of the invention resides in the novel platen arranged in combination with the grid, said platen including a primary part of the evaporator of a compression refrigeration system. The novel platen serves the threefold purpose of retaining water in the grid during ice formation; providing a uniform cooling gradient across the cells to form clear ice of uniform consistency, and additionally aiding in guiding the ice to the storage bunker after harvesting.

Another feature of the invention resides in the fact that the refrigerant evaporator arranged within the platen is subject to simple fabrication due to the fact that the platen structure may simply be cast around the formed evaporator coils.

A further feature of the invention resides in the fact that the relatively uniform platen structure serves to increase the heat transfer surface of the evaporator coils so as to improve the efficiency of refrigeration of the cells of the grid.

These novel features, and the novel structural components and their mode of functioning, will be made most manifest and particularly pointed out in clear, concise and exact terms in conjunction with the accompanying drawings, wherein:

FIGURE 4 is a perspective view with parts broken away of the water distribution header;

FIGURE 5 is a top perspective view of the water collection pan;

FIGURE 6 is a schematic diagram of the refrigeration system employed in the novel apparatus;

Referring now more particularly to the drawings, like numerals in the various figures will be employed to designate like parts.

Figure 1:
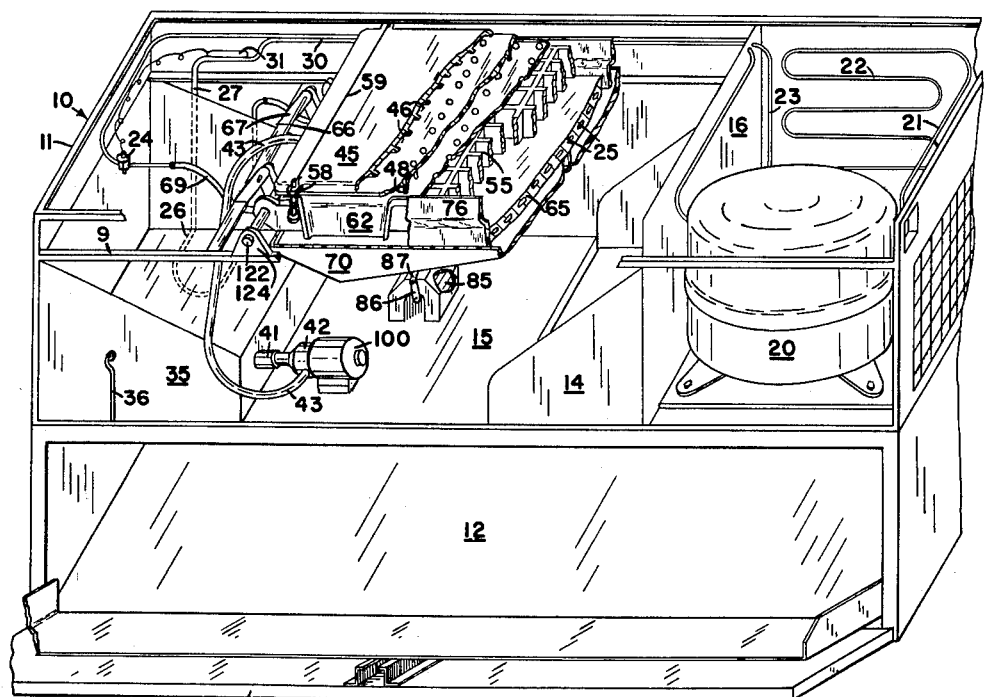
FIGURE 1 represents a perspective view with parts broken away of the novel ice making apparatus incorporating the features of this invention.

As best seen in FIGURE 1, the novel ice making apparatus 10 is shown arranged within a rectangular housing 11 formed of sheet metal, or the like relatively rigid sheet material supported on a frame work 9 of angle irons, or the like. A bunker 12 is formed at the bottom of the housing 11, and provided with a hinged door 13 permitting access to the interior of bunker 12. Leading to the bunker is a chute 14 extending from an opening in horizontal partition 15 arranged above the bunker 12. Vertical partition wall 16 extends upwardly from horizontal partition 15 and separates the heat dissipating components of the refrigeration system, to be hereinafter described, from the ice forming equipment, and the water supply equipment, as seen to the left in FIGURES 1 and 2.

The refrigeration system employed as best seen in FIGURES 1 and 6 comprises a compressor 20 constituted by a sealed motor compressor unit such as is conventionally employed in compression refrigeration systems. The compressor 20 is coupled via discharge line 21 to condenser 22 which is connected via liquid line 23 through expansion valve 24 to primary platen evaporator 25 in series with secondary water pre-cooling evaporator 26, from which suction line 27 extends back to compressor 20. It will be observed that portions of liquid line 23 and suction line 27 are arranged in heat exchange relation as shown at 30.

Expansion valve 24 is controlled by means of thermostatic bulb 31 arranged in heat exchange relationship with suction line 27 so that the amount of refrigerant flowing from the condenser 22 to the evaporator is regulated in response to temperature of refrigerant in the suction line. A conventional strainer-dryer 28 and a discharge service valve 29 may be placed in liquid line 23. Suction service valve 29′ may be provided in line 27. The other details of the control circuit will be hereafter more fully described.

Figure 7:
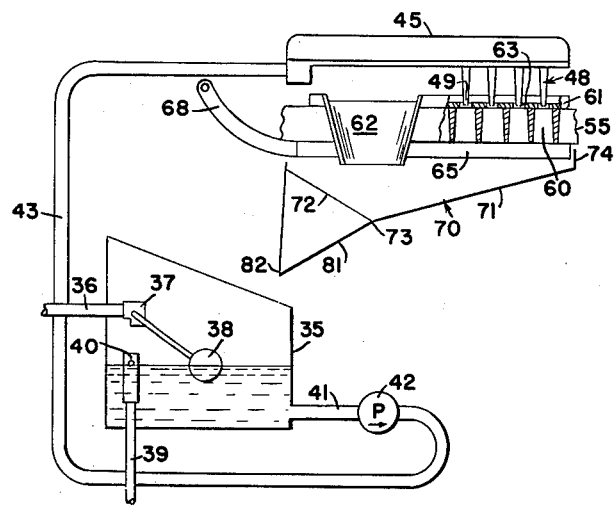
FIGURE 7 is a schematic diagram of the water supply system.

The water supply circuit here employed as best seen in FIGURES 1 and 7 includes a water storage sump 35 to which water is fed by water main connection 36 which feeds water to sump 35 through float controlled valve 37, the opening of which is regulated by the position of float 38 in the sump 35. Overflow pipe 39 formed with siphon cap 40 is arranged in the bottom of the sump to insure that the water level in the sump will not exceed a desired maximum. Sump discharge line 41 leads the water from the sump through pump 42 via flexible water header supply line 43 to water distribution header 45.

Figure 3:
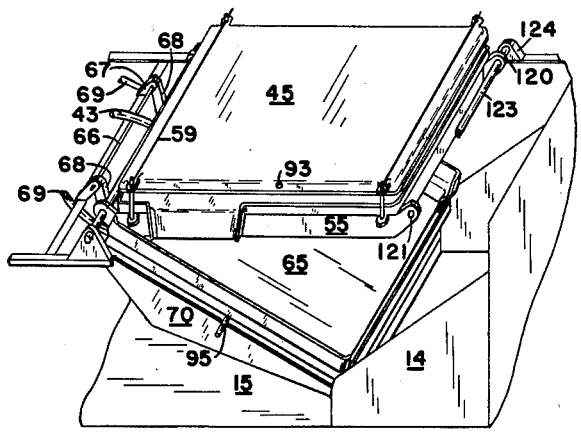
FIGURE 3 is a perspective detail view looking downwardly on the water distribution header, the grid, the evaporator platen, and the water collection pan, shown during the harvesting cycle of the apparatus of FIGURE 1.

Water header 45 as best seen in FIGURES 3 and 4 is formed in a plate-like configuration with a plurality of distribution channels 46 arranged to direct water from header inlet 47 to a plurality of spaced ejector nozzles 48. The water header 45 is formed of a suitable relatively rigid material preferably by molding or the like technique implementing the formation of a closed hollow plate-like member in which a plurality of distribution channels may readily be formed. The shape of the channels, and the shape of the internal cross section of the nozzles 48 is such as to provide a relatively uniform distribution of water pressure throughout the header 45 so that the flow of water from each of the nozzles is substantially the same.

Each of ejector nozzles 48 is formed with a nose portion 49 having an orifice 50 at the tip thereof. The water header 45 is slidably mounted with respect to grid 55 by means of pins 56 arranged at the respective corners of the header 45. The pins 56 extend slidably through apertures in corner ears 58 formed on the header 45 and these pins are fixed at their lower ends in the corners of grid 55 with the keeper rods 59 limiting upward movement of header 45. Compression springs 57 are arranged about pins 56 between the header 45 and grid 55 to bias the header 45 upwardly away from the grid as viewed in FIGURES 1 and 2.

Grid 55 is fixedly mounted with respect to housing 11. An ear 120 is secured at each corner of the grid. Each ear has an opening 121 therein. Support rods 122 and 123, which are mounted in brackets 124 secured to the framework 9 extend through the openings 121 and support grid 55.

Grid 55 is formed with a plurality of cells 60 which confine a volume having a configuration like that of the ice bodies to be formed. As previously noted, the rectilinear configuration commonly called an "ice cube" is preferred, and to this end the grid 55 is formed with a plurality of cube like cells so that any water frozen therein will be formed into these so-called ice cubes. Grid 55 as best seen in FIGURES 1 and 7 is formed with a water deflection plate or tray 61 arranged to extend over the top surface thereof. Overflow lip 62 is formed on one end of the deflection tray to direct any excess water downwardly over the side of grid 55 in a fashion to be hereinafter more fully described. A plurality of apertures 63 is arranged coaxially with the center line through each of the cells 60 and as viewed in FIGURES 1 and 7 it will be observed that the apertures 63 are of a size to permit the ejector nozzles employed to supply water to the grid cells to pass therethrough.

However, in the pre-harvesting, or ice forming position shown in FIGURE 7, only the nose portions 49 of nozzles 48 are arranged within aperture 63, so that there is a clearance between the apertures 63 and nose portion 49, whereby water may flow through said clearance for a purpose to be made hereinafter more apparent. The water deflection tray 61 may be suitably formed of any readily formable sheet material, but is preferably formed of a strong, light weight plastic, such as styrene copolymer.

Platen 65 is pivotally mounted on pivot rod or shaft 66 extending through bearing fulcrum 67 provided on framework 9. Ears 68 are extended upwardly and outwardly from the plane of platen 65 and are secured on shaft 66 so that the platen 65 may lie flush against the bottom of grid 55 as viewed in the drawings, but may also pivot about an axis through rod 66 as viewed in FIGURE 3 to permit those portions of the platen in contact with the grid to move a distance at least equal to the height of an ice cube away from the grid to permit discharge of the formed ice. The platen 65 is of a plate-like configuration substantially coextensive with the bottom area of grid 55, and is preferably formed with a serpentine passageway so as to accommodate the tubing employed in fabricating evaporator 25 as seen in FIGURE 6. The portion of evaporator 25 arranged within the serpentine passageway in platen 65 is connected to the refrigeration system by flexible refrigerant conduits 69 so as to permit movement of the platen containing primary evaporator 25 with respect to the relatively fixed refrigeration system components. The top surface of the platen 65 is sufficiently smooth to provide relatively contiguous surface engagement with the bottom of grid 55 whereby the cells 60 will be closed off to retain water therein when the platen 65 is in its upward position as illustrated in FIGURES 1 and 7.

Figure 2:
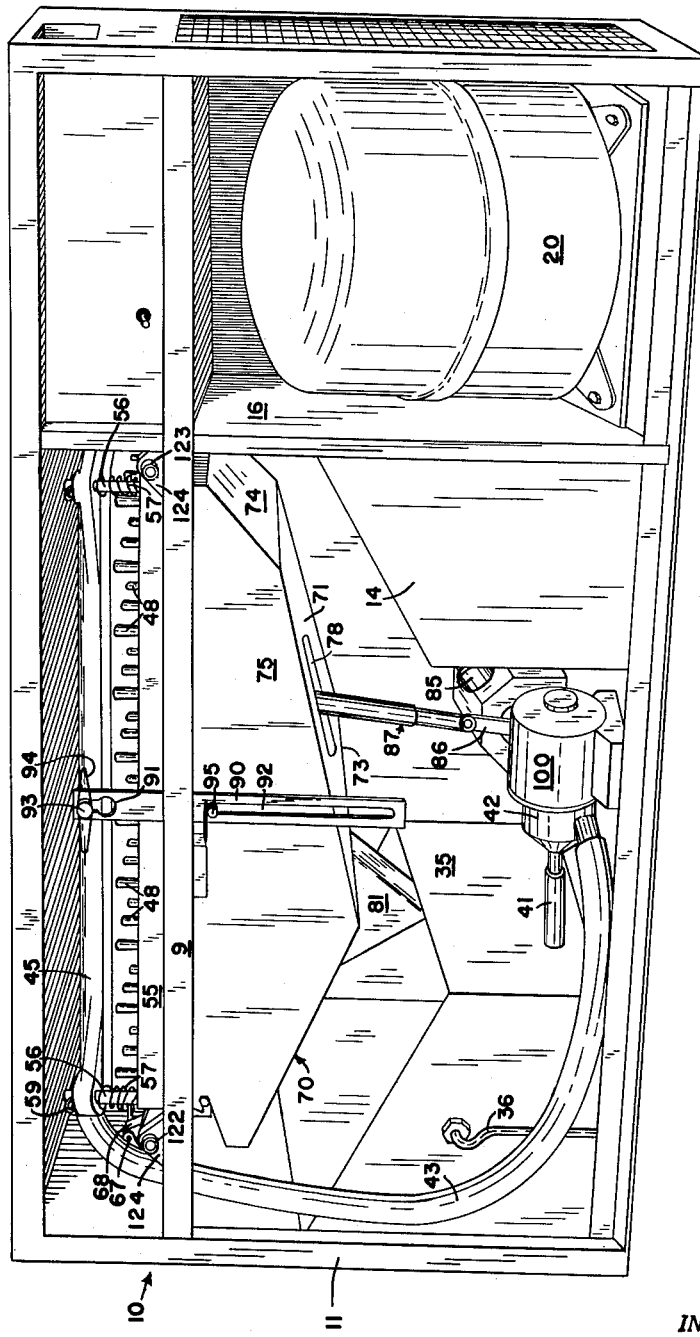
FIGURE 2 is a front perspective view looking upwardly at the water supply components and ice making components of the apparatus shown in FIGURE 1.

Positioned beneath grid 55 and platen 65 is a water collection pan 70 as best seen in FIGURES 2, 5 and 7, formed with a bottom trough having a front downwardly and rearwardly inclined bottom plate 71 and a rear forwardly and downwardly inclined bottom plate 72 converging along a low point line 73 which forms a low point in the pan 70. Front wall 74 is upstanding from the leading edge of bottom plate 71. Side walls 75 extend along the sides of the trough to enclose same to form pan 70 as viewed in FIGURE 5.

Splash guards 76 are removably secured to platen 65 and extend upwardly therefrom a distance permitting the splash guards to enclose the water deflection tray 61 as viewed in FIGURE 1, whereby any water passing over overflow lip 62 will be deflected to pan 70. Splash guards 76 also direct harvested ice bodies to the ice chute 14.

The front bottom plate 71 of pan 70 is formed with opening 78 surrounded by lip 80 which extends completely thereabout for a purpose to be made hereinafter more apparent. Discharge spout 81 extends downwardly from low point line 73 to discharge opening 82 whereby water collected in said pan 70 may be discharged to the sump 35 as viewed in FIGURES 2 and 7.

Supported on partition 15 above bunker 12 is a gear motor 85 having a crank arm 86 coupled to connecting rod 87 which extends upwardly through aperture 78 and is connected to platen 65, whereby operation of the motor will cause the platen to move downwardly pivoting about pivot rod 66, as viewed in FIGURE 2. The connecting rod 87 is formed as a telescoping member with a spring (not shown) arranged between the upper and lower telescoping parts of the connecting rod whereby a cushioning effect is obtained in the event that the motion of the connecting rod is obstructed.

A strap 90, as best seen in FIGURE 2 is secured between header 45 and platen 65 on opposite sides of each for a purpose to be made hereinafter more apparent. Strap 90 is formed with an upper keyhole pivot slot 91 and a lower lost motion slot 92. Headed pin 93 is extended from header 45 into keyhole slot 91 and suitably secured therein by hairpin spring 94. Lost motion slot 92 engages pin 95 secured to platen 65.

Figure 8:
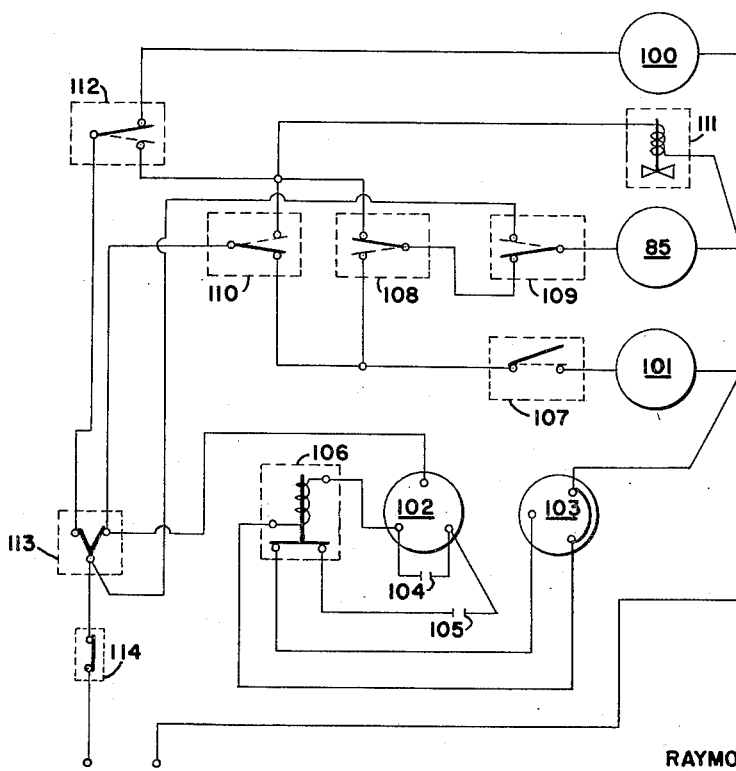
FIGURE 8 is a schematic circuit diagram of the controls.

The control circuit diagram illustrated in FIGURE 8 includes a pump motor 100 employed for driving pump 42, gear motor 85, and condenser fan motor 101 utilized for driving the condenser fan to direct air into heat exchange relationship with condenser 22 of the refrigeration system here employed. The circuit also includes the compressor motor 102, the overload relay 103, the running capacitor 104, the starting capacitor 105 and starting relay 106. Pressure sensitive fan cut-out switch 107 is arranged in the fan motor circuit. Gear motor switch 108 is arranged in the gear motor circuit along with manual control gear motor switch 109. Temperature and pressure sensitive defrost control switch 110 is arranged in a circuit with the relay of defrost solenoid valve 111 and fan motor 101 as best seen in FIGURE 8. Control 115 shown in FIGURE 6 contains switch 110. The control is connected to suction line 27 by line 116 so as to be responsive to the pressure of the refrigerant flowing through line 27 to move switch 110 to the position shown in dotted line in FIGURE 8 to terminate the freezing cycle and initiate defrosting. The control is connected to thermostatic bulb 117 so as to be responsive to a predetermined temperature indicative of the completion of defrosting to move switch 110 to the position shown in solid line in FIGURE 8 to initiate harvesting of the ice cubes. Harvest control switch 112 is arranged to control the flow of current to gear motor 85, and main power switch 113 is arranged to control the energization of the aforedescribed circuit components. Bunker switch 114 is arranged to deenergize all the components of the electrical control system when a predetermined quantity of ice is collected in the bunker 12.

In use, the ice forming apparatus here provided is intended for the relatively continuous production of ice bodies such as would be required in a commercial eating establishment. The ice bodies formed by the instant apparatus are as noted the so-called ice cubes. Installation of the apparatus is possible in any area permitting connection to a water supply main and an electrical power supply source.

Water is supplied from the main to sump 35 in a quantity such as to fill the sump to a level determined by the adjustment of flow control valve 37. When this level has been attained float 38 rises, shutting valve 37, and the supply of water to sump 35. Water pump 42 directs the water from sump 35 to header 45 via flexible water supply line 43. The flexibility of water supply line 43 permits movement of header 45 with respect to water pump 42 for a purpose to become hereinafter more apparent.

In header 45, the water is distributed from inlet 47 as viewed in FIGURE 4 through channels 46. As noted, the dimensioning of the header channels 46 is such as to provide for a uniform pressure at each of the nozzles 48. The water in channels 46 is ejected from the header to the grid via ejector nozzles 48 where it will be observed that the infundibular cross section of the nozzle as viewed in FIGURE 4 provides for a velocity increase at the orifice 50 in nose portion 49 as the water leaves the header for distribution in cells 60 of grid 55.

The water flowing into cells 60 is agitated as a result of the turbulence produced by the action of ejector nozzles 48 directing water into the cells 60 confined by water plate 61. Any overflow resulting from this turbulence is directed outwardly through the space between the nozzle nose portion 49 and the apertures 63 in plate 61. The overflow through these apertures 63 drains downwardly to overflow lip 62 whence it is directed to water collection pan 70. It will be observed that the amount of water supplied to cells 60 is in excess of the amount of water frozen during any given period of time so that there will always be an overflow along plate 61. This excess water flow agitates the water in the cells, and though interfering slightly with the rate of ice formation, serves to eliminate from the formed ice any foreign matter whether solid or gaseous since the cleaner water tends to freeze first and the overflow serves to remove the foreign matter, and the agitation releases undesirable gases.

Water collection trough or pan 70 is formed in a novel fashion whereby cleaning of the trough components is implemented and substantially all the water supplied to the grid, and not frozen is returned to the sump without wetting of the apparatus components. The splash guards 76, which are removable for cleaning purposes, serve to deflect any water flowing over plate 61 downwardly to pan 70 thus preventing wetting of the other apparatus components due to splashing as a result of the turbulence in cells 60. Splash guards 76 also serve to direct harvested ice bodies to the ice chute 14. The configuration of pan 70 is such that even in the harvesting position shown in FIGURE 3 low point line 73 is below the top of front wall 74 whereby water is still drained downwardly to the sump via spout 81 thus maintaining the apparatus components in a relatively dry condition. Appropriate filters are of course arranged in the sump inlet and outlet so as to remove any impurities.

The refrigeration system here provided permits simple and effective cooling of the water retained in the cells of grid 55 by utilization of an evaporator coil 25 arranged within platen 65. When the refrigeration system is operating, the evaporating refrigerant passing through the primary evaporator 25 and secondary evaporator 26 of the refrigeration system serves to cool any water in the cells and in the sump respectively which are in heat exchange relationship with said evaporators. The arrangement of the evaporator within platen 65 is a relatively simple matter eliminating the problems heretofore encountered in attempting to arrange the evaporator coils within the grid structure itself. The platen functions to retain water within the cells 60 of the grid and to direct refrigerant from the refrigeration system into heat exchange relationship with the water retained in said cells to freeze same. During the freezing operation, platen 65 is in the position illustrated in FIGURES 1 and 2 where it is held under spring pressure by connecting rod 87. During the operation of the refrigeration system, the evaporating refrigerant flowing through the platen 65 serves to freeze the water retained in cells 60. The refrigerant flowing through secondary evaporator 26 arranged in heat exchange relationship with sump 35 either in the water or in the sump wall serves to chill the water in the sump prior to its distribution to cells 60, whereby the time required to effect freezing of the water is diminished.

After the cells 60 are filled with ice, the ice is freed from the cells by directing hot refrigerant from compressor 20 to coils 25 which results in a breaking of any bond between the ice and the walls of cells 60. Thereafter harvesting of the ice is accomplished by energizing motor 85, lowering platen 65 to the position illustrated in FIGURE 3 in which the free edge of platen 65 assumes a position over chute 14 and the platen edge closest to the shaft 66 has moved a distance at least equal to the height of a cube whereby sufficient clearance exists to permit the ice cubes released from the cells of the grid to fall onto the platen for direction to bunker 12. Simultaneously with the lowering of platen 65 to its lowermost position for a short part of its movement before reaching its bottom point, pin 95 engages the bottom of slot 92, pulling strap 90 downwardly against the action of springs 57, forcing the nose portions 49 of ejector nozzles 48 against the ice in cells 60, whereby any ice cubes remaining in the grid are positively ejected from the cells onto platen 65. It will be observed that the platen limits the distance through which the ice cubes must fall and serves to guide same in a relatively non-jarring fashion into bunker 12 whereby spalling of the cubes is maintained at a minimum.

After harvesting, the platen is again raised to the position illustrated in FIGURES 1 and 2, and the cycle of operation is re-initiated. During the formation of the next batch of cubes, those previously formed harvested cubes are available for use in bunker 12 which is appropriately insulated.

The aforedescribed cycle of operation may be automatically attained by utilizing a control circuit such as shown schematically in FIGURE 8. When apparatus operation is initiated, the control arms of main power switch 113 are positioned to engage both contacts as indicated in the drawing. For cleaning the apparatus only the left hand contact is engaged. In the off position of the apparatus, neither contact is engaged by the control arms. The switch arms of the other switches are then in the position indicated by solid line in the drawing, under which circumstances the compressor motor 102 and pump motor 100 are actuated; fan motor 101 is inoperative; gear motor 85 is inoperative, and solenoid valve 111 is closed. As the compressor operates, the pressure within the refrigeration system will build up and at a predetermined head pressure the arm of switch 107 will be closed, energizing the circuit to the fan motor 101. After the ice has been formed in the cells of the grid, the refrigerant pressure in the evaporator drops. This drop in pressure is sensed by control 115 and the arm of temperature and pressure sensitive defrost control switch 110 moves to the dotted line position closing the circuit to the relay of solenoid valve 111, opening the hot gas line from condenser 22 to primary evaporator 25 as viewed in FIGURE 6 and opening the circuit to the condenser fan motor 101, stopping the fan motor. Gear motor 85 is simultaneously actuated to move a cam causing the arm of gear motor switch 108 to move to the dotted line position, whereby the gear motor 85 is stopped with platen 65 still contacting the grid and maintaining the hot refrigerant gas flowing through the primary evaporator in heat exchange relationship with the grid cells to effect defrosting. When thermostatic bulb 117 senses a temperature indicative of the completion of defrosting, control 115 is actuated and the arm of the switch 110 moves back to the solid line position. Motor 85 is energized to lower the platen, causing ejection of the ice cubes, and to raise the platen to the freezing position as aforedescribed. As the platen lowers, switch 112 moves to the position shown in dotted lines, stopping pump motor 100. As the platen returns to a position sealing the cells of the grid, switch 112 is moved to the position shown in solid line, restarting pump motor 100. Immediately after switch 112 is tripped to the position shown in solid line, a cam on gear motor 85 moves the arm of switch 108 to the solid line position, stopping the gear motor 85. All the switches are now in the normal freezing position and the freezing cycle is reinitiated. When a predetermined quantity of ice is collected in the bunker, switch 114 is opened to deenergize the control circuit.

Though a complete ice forming machine has been disclosed embodying the instant inventive concept, it will be understood by those skilled in the art that the invention may be employed in conjunction with a variety of other ice forming apparatus. The invention here presented resides in the novel platen containing the refrigerant evaporator. The platen serves the threefold function of (1) closing off the cells of the grid to retain liquid to be frozen therein; (2) maintaining evaporating refrigerant in heat exchange relationship with the liquid confined in the cells; and (3) upon formation of the desired ice aiding in directing the harvested ice to a collection bunker with a minimum of jarring. The structure of the platen is such that problems previously encountered in arranging the refrigerant coils of the evaporator in heat exchange relationship with the grid cells are substantially eliminated, and the cooling gradient provided across the cells is relatively uniform, whereby a simplicity of production results, as well as a desired uniformity of cooling of the liquid to be frozen.

The above disclosure has been given my way of illustration and elucidation, and not by way of limitation, and it is desired to protect all embodiments of the herein disclosed inventive concept within the scope of the appended claims.

We claim:

1. Ice forming means comprising: open-bottom confining means defining the volumetric configuration of that of the ice to be formed; closure means beneath and movably mounted with respect to said confining means serving to retain a liquid to be frozen in said confining means; heat exchanger means in said closure means through which a heat absorbing refrigerant may be circulated and through which a hot gaseous refrigerant may be circulated; supply means adjacent said confining means for directing a liquid to be frozen into said confining means; and liquid collection means arranged to receive any excess liquid from said confining means and return same to said supply means, said liquid collection means being secured to said closure means, whereby the liquid to be frozen may be confined and frozen into ice of desired configuration and then released from the confining means when hot gaseous refrigerant is circulated through the heat exchanger means.

2. Ice forming means comprising: confining means defining the volumetric configuration of that of the ice to be formed; closure means movably mounted with respect to said confining means serving to retain a liquid to be frozen in said confining means; heat exchanger means in said closure means in heat exchange relationship with said confining means through which a heat absorbing refrigerant may be circulated to freeze the liquid in the confining means and through which hot gaseous refrigerant may be circulated to release formed ice from said confining means; supply means adjacent said confining means for directing a liquid to be frozen into said confining means from the top; and means for moving said closure means from said confining means in response to a predetermined temperature condition to release the ice formed therein.

3. Ice forming means comprising: confining means defining the volumetric configuration of that of the ice to be formed, said confining means having an open bottom; closure means movably mounted with respect to said confining means serving to retain a liquid to be frozen in said confining means; heat exchanger means integral with said closure means and in heat exchange relationship with said confining means, a heat absorbing refrigerant being circulated through said heat exchanger means to freeze the liquid and hot gaseous refrigerant being circulated through said heat exchanger means to release formed ice; supply means adjacent said confining means for directing a liquid to be frozen to said confining means; nozzle means coupled to said supply means and arranged coincident with said confining means to eject liquid from said supply means into the volume confined by said confining means from the top; and motor means moving said closure means downwardly from said confining means to release the ice formed therein.

4. A method of forming ice, said method comprising the steps of confining a volume having a configuration like that of the ice to be formed; supplying liquid to be frozen to the top of the confined volume; retaining the liquid in the confined volume from below the volume; absorbing heat from the bottom of the retained confined liquid to form ice; collecting any excess liquid supplied to the confined volume; and applying heat from the bottom and from the sides of the confined volume to release the formed ice from the confined volume.

5. Ice forming apparatus comprising: a grid having a plurality of cells defining the side bounds of the ice to be formed; a platen movably mounted beneath said grid, adapted for positioning to close off the bottom of the grid cells to retain a liquid to be frozen therein; a portion of the evaporator of a compression refrigeration system supported by said platen in heat exchange relationship with the grid cells for forming ice in the grid cells and for warming the grid cells to release the formed ice therefrom; a liquid supply system including a header arranged adjacent said grid to supply liquid to be frozen to the cells of said grid; a liquid collection pan connected to the platen and arranged beneath said grid to receive any axcess liquid supplied to the cells of said grid by said header; and a motor coupled to said platen to move same away from said grid after ice has been formed to release the ice from the cells.

6. Ice forming apparatus comprising: a grid having a plurality of cells defining the side bounds of the ice to be formed; a platen movably mounted beneath said grid, adapted for positioning to close off the bottom of the grid cells to retain a liquid to be frozen therein; a portion of the evaporator of a compression refrigeration system supported by said platen in heat exchange relationship with the grid cells; a liquid supply system arranged adjacent said grid to supply liquid to be frozen to the cells of said grid; a plurality of nozzles receiving liquid from said supply system, said nozzles arranged coincident with the cells of said grid for discharging liquid into the tops of the cells; and a motor coupled to said platen to move same downwardly away from said grid in response to a predetermined temperature condition after ice has been formed to release the ice from the cells.

7. A method of forming ice, said method comprising the steps of: confining a plurality of volumes, each having a configuration like that of the ice to be formed; supplying liquid to be frozen to the confined volumes; ejecting liquid to be frozen into the tops of each of the confined volumes; retaining the liquid in the confined volumes from below the volumes; absorbing heat from the bottom of the retained confined liquid to form ice; applying heat to the bottom and sides of the confined volumes to free the ice; and releasing the ice from the confined volumes.

References Cited in the file of this patent

UNITED STATES PATENTS

| | | |
|---|---|---|
| 2,526,262 | Munshower | Oct. 17, 1950 |
| 2,563,093 | Bayston | Aug. 7, 1951 |
| 2,613,506 | Cook | Oct. 14, 1952 |
| 2,701,453 | Henderson | Feb. 8, 1955 |
| 2,763,993 | Bayston | Sept. 25, 1956 |